United States Patent
Stek et al.

(10) Patent No.: US 6,845,134 B2
(45) Date of Patent: Jan. 18, 2005

(54) ARRANGEMENT FOR RECEIVING A DIGITAL SIGNAL FROM A TRANSMISSION MEDIUM

(75) Inventors: Aalbert Stek, Eindhoven (NL); Theodorus Petrus Henricus Gerardus Jansen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 738 days.

(21) Appl. No.: 09/741,670

(22) Filed: Dec. 19, 2000

(65) Prior Publication Data

US 2001/0004392 A1 Jun. 21, 2001

(30) Foreign Application Priority Data

Dec. 20, 1999 (EP) .............................. 99204401

(51) Int. Cl.⁷ .............................. H04B 1/00; H04B 3/00
(52) U.S. Cl. ...................................... 375/350; 375/231
(58) Field of Search ............................... 375/230–232, 375/350; 708/323

(56) References Cited

U.S. PATENT DOCUMENTS

| | | | | |
|---|---|---|---|---|
| 5,168,507 A | * | 12/1992 | Critchlow et al. | 375/231 |
| 5,237,588 A | * | 8/1993 | Tanaka et al. | 375/230 |
| 5,274,512 A | * | 12/1993 | Tanaka et al. | 360/65 |
| 5,321,723 A | * | 6/1994 | Mizoguchi | 375/233 |
| 5,640,418 A | * | 6/1997 | Tanaka | 375/232 |
| 5,668,832 A | * | 9/1997 | Yamamoto | 375/233 |
| 6,272,173 B1 | * | 8/2001 | Hatamian | 375/229 |
| 6,549,087 B1 | * | 4/2003 | Hoang et al. | 333/15 |

FOREIGN PATENT DOCUMENTS

| EP | 0 332 079 A2 | * | 9/1989 | ........... G11B/20/10 |
|---|---|---|---|---|
| EP | 0332079 A2 | | 3/1990 | |
| EP | 0387813 A2 | | 3/1990 | |

* cited by examiner

Primary Examiner—Stephen Chin
Assistant Examiner—Lawrence Williams
(74) Attorney, Agent, or Firm—Michael E. Belk

(57) ABSTRACT

An arrangement is disclosed for receiving a digital signal from a transmission medium. The arrangement comprises a variable equalizer for equalizing a received signal so as to obtain an equalized signal, and bit-detector for detecting a sequence of bits from the equalized signal. The arrangement further comprises an asynchronous sampling unit for sampling a received analog signal so as to obtain a first signal having asynchronous samples. To control the variable equalizer a control signal is generated from the values of at least one sample of a signal having asynchronous samples, at either side of a zero crossing in signal.

20 Claims, 3 Drawing Sheets

ARRANGEMENT FOR RECEIVING A DIGITAL SIGNAL FROM A TRANSMISSION MEDIUM

Figure 1:
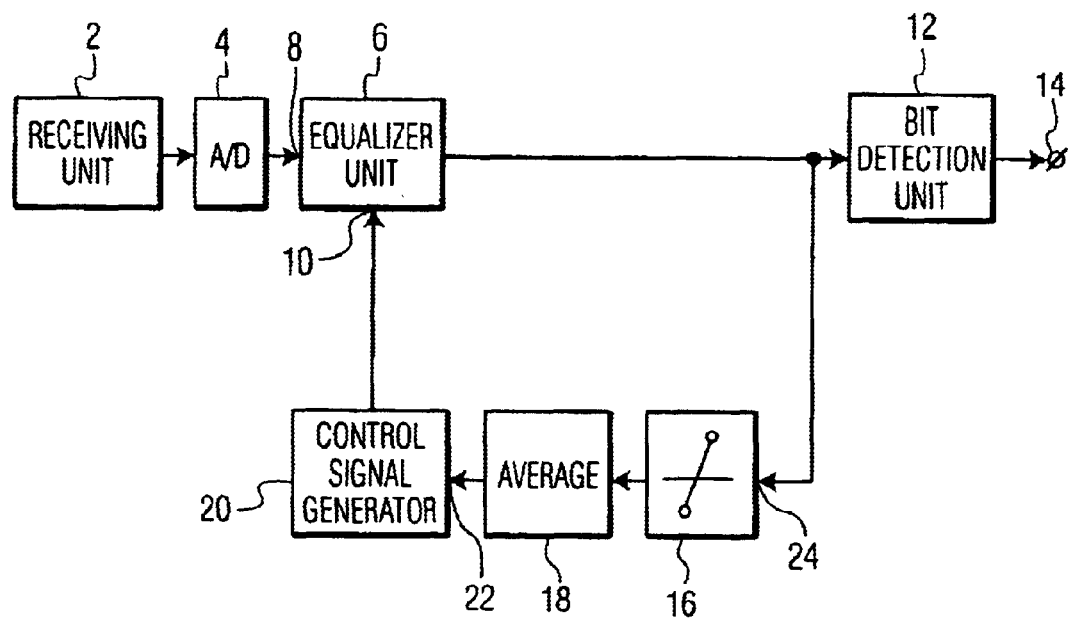

The invention relates to an arrangement for receiving a digital signal from a transmission medium. Said arrangement comprises:

input means for receiving a signal from the transmission medium, asynchronous sampling means for sampling an analog signal so as to obtain a first signal having asynchronous samples, variable equalizer means having an input coupled to an output of the input means, a control signal input for receiving a control signal, and an output for supplying an equalized signal, equalizer control signal generator means having an input, and an output for supplying an equalizer control signal, which output is coupled to the control signal input of the equalizer means, signal detector means, having an input coupled to the output of the variable equalizer means, and an output for supplying the digital signal, the signal detector means being adapted to detect the digital signal from the equalized signal, an output terminal coupled to the output of the signal detector means, for supplying the digital signal.

An arrangement as defined above is known from EP 0 387 813 A2. Said document describes an arrangement comprising a variable equalizer. The arrangement receives a signal from the transmission medium. An analog-to-digital converter converts the received signal into a first digital signal having asynchronous samples. The variable equalizer equalizes the first digital signal so as to obtain an equalized signal. A PLL circuit derives samples of the digital signal from the equalized signal synchronous. An equalizer control signal generator unit processes the synchronous samples so as to obtain an equalizer control signal for controlling the variable equalizer. The equalizer control signal generator unit comprises a detection unit. The detection unit detects the error rate of the digital signal. The error rate strongly depends on the correct operation of the PLL circuit and bit detection unit. The equalizer control signal unit generates the equalizer control signal in response to the error rate.

It is an object of the invention to provide an arrangement for receiving a digital signal with which it is possible to control the variable equalizer faster and independently of the operation of a PLL circuit.

The arrangement in accordance with the invention is characterized in that, the input of the equalizer control signal generator means is adapted to receive a second signal having asynchronous samples, the equalizer control signal generator means comprises detection means for detecting the instant at which the second signal crosses a predetermined signal value, so as to obtain a detection signal, and means for, in response to said detection signal, deriving the equalizer control signal from at least one asynchronous sample value of the second signal on either side of the instant at which the second signal crosses said predetermined signal value, said equalizer control signal being derived from said at least two samples by means of an operation equivalent to arithmetically combining said at least two asynchronous sample values.

The invention is based on the following recognition. In order to correct variations in the received signal a robust error signal must be derived from the incoming signal. The received signal, representing a sequence of bits, can be obtained from a transmission medium such as a magnetic record carrier, for example a magnetic tape, an optical record carrier, for example an optical disk, or a transmission channel, for example a broadcast signal. If the signal is obtained from a magnetic tape, the signal may be distorted by head-to-tape distance, resulting in a variation in attenuation at the high frequencies in the received signal. Furthermore, the roughness of the tape or wear of the read head may attenuate the high frequencies in the received signal. If the signal is received from an optical disk, the signal may be distorted by tilting of the disk, resulting in a phase change at the high frequencies. It has been found that the result of arithmetical combinations of one asynchronous sample value on each side of a zero crossing of the binary signal has a relationship with said distortions. Said result is used to generate the control signal for controlling the variable equalizer. It should be noted that the term zero crossing should not be restricted to the meaning that a signal passes the signal value zero, but meant is that the signal passes a predetermined signal value, which value could be zero or any other value.

In an embodiment of the arrangement, the arrangement is characterized in that an input of the asynchronous sampling means is coupled to the output of the input means, and an output of the asynchronous sampling means is coupled to the input of the variable equalizer means, and the input of the equalizer control signal generator means is coupled to the output of the variable equalizer means, for receiving said second signal having asynchronous samples. In this embodiment the variable equalizer is in the form of a digital variable equalizer. Preferably, the variable equalizer is in the form of a finite impulse response filter. A FIR filter having a DC gain of 1 and adapted to compensate for the high-frequency attenuation could be in the form of a 3-tap FIR filter having a transfer function $$H(z)=C_0+2C_1z^{-1}+C_0z^{-2},$$

where $C_0=\frac{1}{2}-C_1$. A FIR filter to compensate for the high-frequency phase change could be in the form of a 3-tap FIR filter having a transfer function $H(z)=\Delta+z^{-1}-\Delta z^{-2}$. To compensate for both the attenuation and the phase change at high frequencies a 3-tap FIR filter having a transfer function $$H(z)=(C_0+\Delta)+2C_1z^{-1}+(C_0-\Delta)z^{-2},$$

where $C_0=\frac{1}{2}-C_1$ could be used.

In another embodiment of the arrangement, the arrangement is characterized in that an input of the asynchronous sampling means is coupled to the output of the variable equalizer means, and the input of the equalizer control signal generator means is coupled to an output of the asynchronous sampling means, for receiving said second signal having asynchronous samples. In this embodiment the variable equalizer means is in the form of an analog filter.

In a further embodiment of the arrangement, the arrangement is characterized in that said arithmetic combination means complies with the formula: $S(t)=c\times|X(t)-X(t-1)|$, where $X(t)$ is a sample of the second signal directly following the instant at which the second signal crosses a predetermined signal value, $X(t-1)$ is a sample of the second signal directly preceding said instant, c is a constant, and $S(t)$ is an intermediate signal for deriving said equalizer control signal. In the received signal high frequencies may be attenuated due to, for example, head-to-tape distance or high frequency losses due to the transmission medium. Said formula calculates the slope of the signal around a zero crossing. Said slope has a relationship with the amplitude of high frequencies in the signal. It appears that the amplitude has an almost linear relationship with the head-to-tape distance and is therefore easy to use as an error signal in a control loop.

In another embodiment of the arrangement, the arrangement is characterized in that said arithmetic combination means complies with the formula: $S(t)=c\times(X(t)-X(t-1))$, where $X(t)$ is a sample of the second signal directly following said instant, $X(t-1)$ is a sample of the second signal directly preceding said instant, c is a constant and $S(t)$ is an intermediate signal for deriving said equalizer control signal. The intermediate signal thus obtained has a positive value for zero crossings in the second having a rising slope and a negative value for zero crossings having a falling slope. The difference between the falling slopes and rising slopes has a relationship with the difference in delay caused by the transmission path between low frequency signals and high frequency signals in the operating frequency range of the transmission path. Said intermediate signal is used to control the variable equalizer means so as to correct for said difference in delay. A difference in delay may also be caused by, for example, tangential tilt of an optical record carrier.

To reduce fast variations of the intermediate signal the intermediate signal might be averaged. Furthermore the equalizer control signal generator means may comprise a look-up table, to obtain the equalizer control signal. Instead of a processor to perform the arithmetic combination of the at least two asynchronous sample values, a look-up table may be used. The complexity of the arithmetic combination determines which solution is to be preferred. For example, a non-linear combination with a limited input range can be implemented cost effectively with a look-up table.

Figure 2:
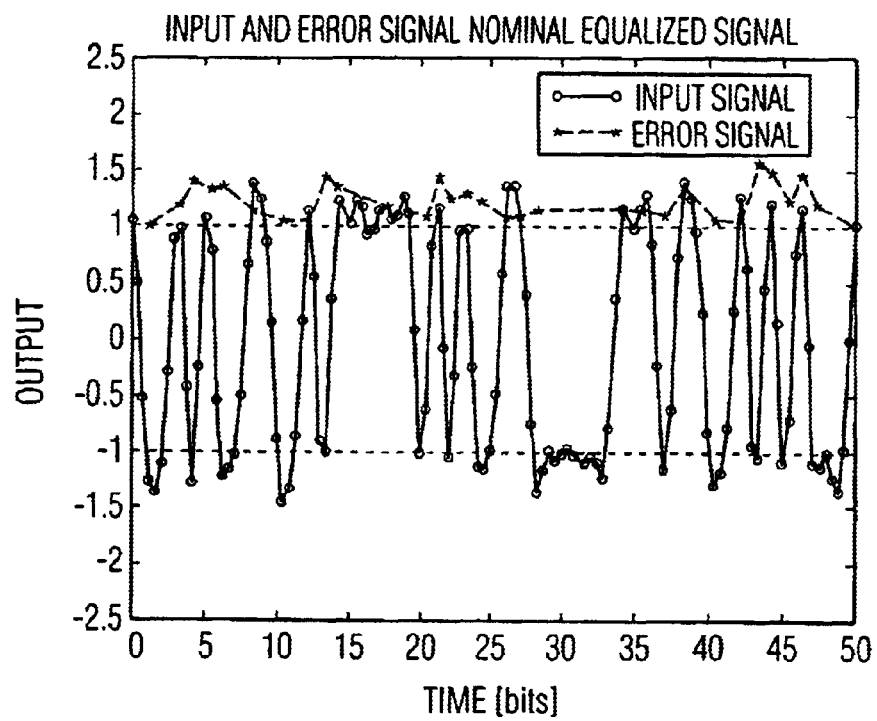
Figure 3:
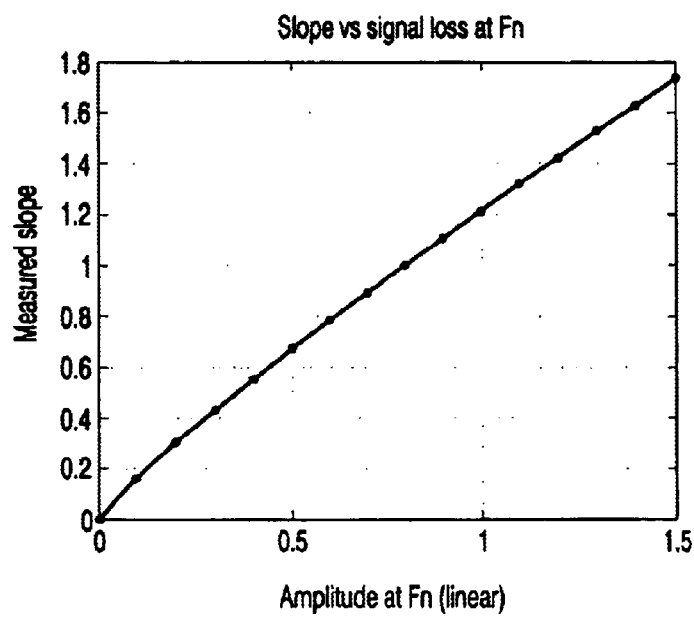
Figure 4:
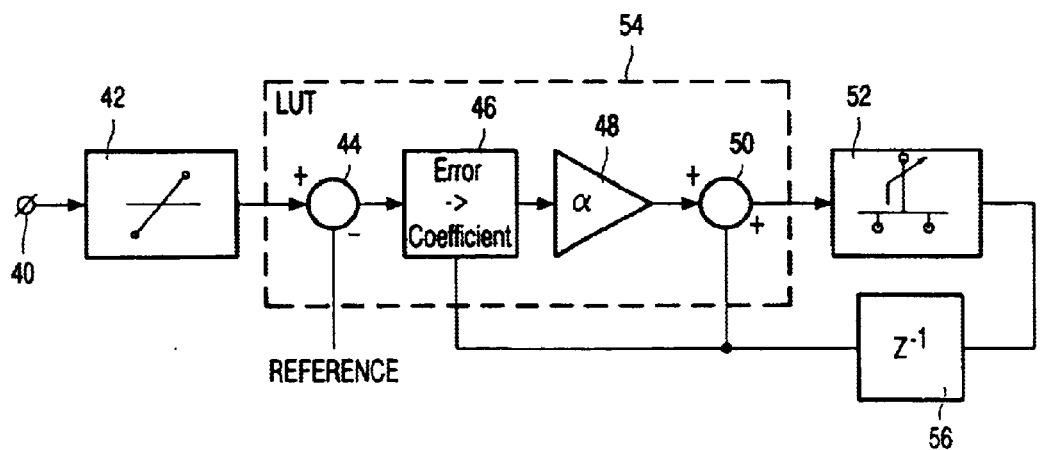
Figure 5:
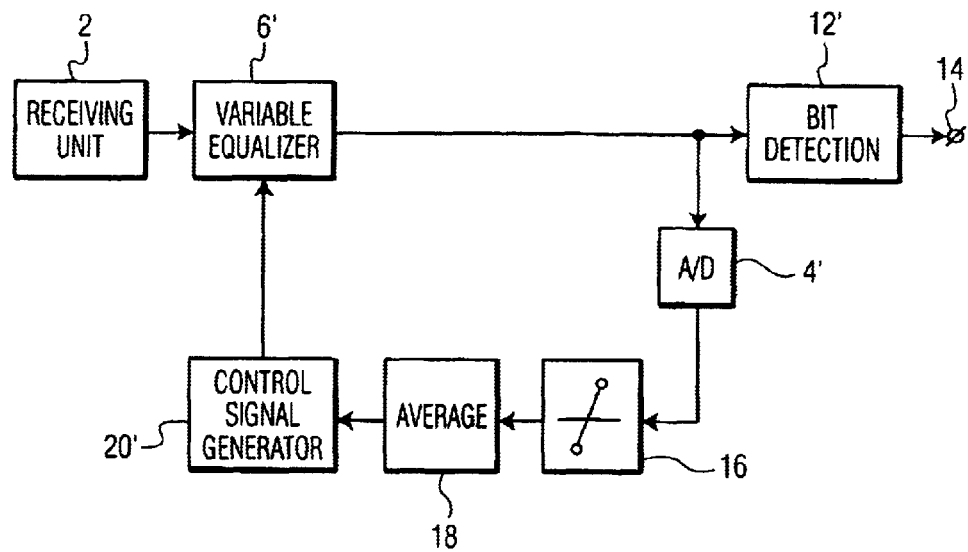

These and other aspects of the invention will be apparent from and elucidated by means of a description of three embodiments with reference to the drawings, in which FIG. 1 shows a first embodiment of an arrangement in accordance with the invention, FIG. 2 shows an input signal and differences around zero crossings, FIG. 3 shows the slope signal versus signal loss at $F_{Nyquist}$, FIG. 4 shows a coefficient update loop, FIG. 5 shows a second embodiment of an arrangement in accordance with the invention.

Figure 6:
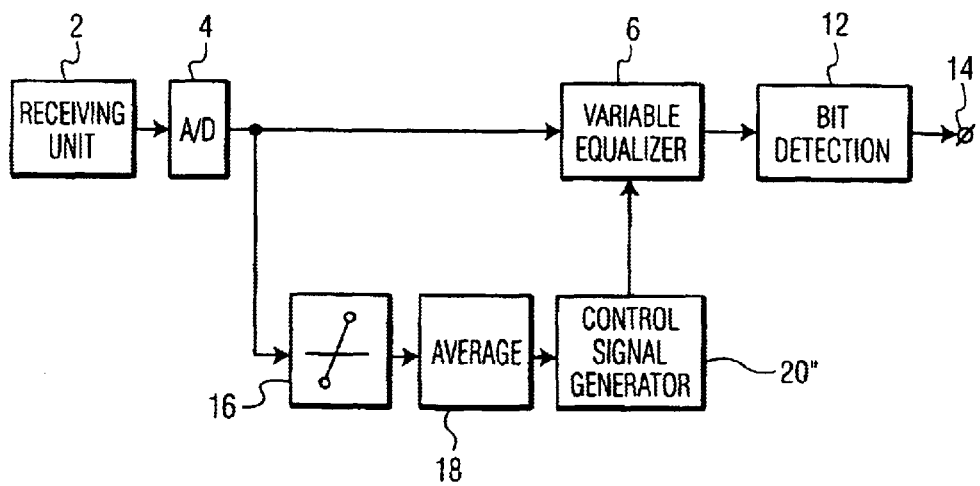

FIG. 6 shows a third embodiment of an arrangement in accordance with the invention.

FIG. 1 shows a first embodiment of an arrangement in accordance with the invention. The arrangement is adapted to receive a digital signal from a transmission medium. Signals received from the transmission medium by means of the receiving unit 2 are supplied to an AD converter 4. The receiving unit 2 may comprise receiving means for receiving a transmitted signal or a read unit for reading a signal from a magnetic or optical record carrier, which record carrier may be in the form of a disk or tape. The AD converter 4 samples the read analog signal so as to obtain a first signal having asynchronous samples. The first signal is supplied to input 8 of a variable equalizer unit 6. The variable equalizer unit 6 is adapted to equalize the transmission characteristic of the transmission path including the transmission medium up to the input 8 of the variable equalizer unit 6 in response to an equalizer control signal supplied to a control input 10 of the variable equalizer unit 6, so as to obtain an equalized signal. The equalized signal is supplied to a bit detection unit 12. The bit detection unit, comprising a PLL and a bit detector, is adapted to detect bits in the equalized signal so as to obtain the digital signal. The digital signal is supplied to an output terminal 14.

The arrangement further comprises a unit 16 for generating a first control signal in dependence on the equalized signal. Optionally, the first control signal is processed by a unit 18 for averaging the first control signal prior to supplying the first control signal to an input 22 of an equalizer control signal generation unit 20. The equalizer control signal generation unit is adapted to generate an equalizer control signal in response to the signal supplied to its input 22, and to supply the equalizer control signal to the control input 10 of the variable equalizer means 6. The first control signal or the averaged first control signal may have a relationship with the high-frequency losses in the amplitude transmission characteristic of the transmission path. For example, the head-to-tape distance causes said losses during reproduction. The first control signal may also have a relationship with differences in delay, caused by the transmission in said transmission path, between low-frequency signals and high-frequency signals in the operating frequency of the transmission path. Differences in delay may occur when a signal is read from an optical record carrier such as a CD, for example due to the fact that the whole optical record carrier has a tilt with respect to the laser beam. Due to deformation of the disc-shaped optical record carrier, the difference in delay may vary with every rotation of the disc. The difference in delay even varies with the radius of a track on said record carrier.

The arrangement described above functions as follows. The digital information signal is received by the receiving unit 2 and sampled by the AD converter so as to obtain a first signal having asynchronous samples. FIG. 2 shows an example of the first signal in the form of a random 8 to 9 encoded read back signal from a tape. The first signal in FIG. 2 is Nyquist-I equalized. The Nyquist-I equalization may be done in a pre-amplifier unit, not shown, before or after the AD converter. The first signal is equalized in the variable equalizer, in order to obtain the equalized signal.

The variable equalizer 6 is adapted to equalize the transmission characteristic of the transmission channel including the recording channel up to the input 8 of the variable equalizer 6. The variable equalizer is preferably a 3 tap Finite Impulse Response Filter. However, any other suitable filter type may be used. To correct high frequency losses the FIR-filter preferably has the transfer function: $H(z)=C_0+2C_1z^{-1}+C_0z^{-2}$, where $C_0=\frac{1}{2}-C_1$. To correct differences in delay the FIR-filter preferably has the transfer function $H(z)=\Delta+z^{-1}-\Delta z^{-2}$. To correct both high frequency losses and differences in delay the FIR-filter preferably has the transfer function $$H(z)=(C_0+\Delta)+2C_1z^{-1}+(C_0-\Delta)z^{-2},$$

where $C_0=\frac{1}{2}-C_1$.

The equalized signal is supplied to an input 24 of the unit 16. The unit 16 comprises signal detector means for detecting the instant at which the signal received at the input 24 crosses a predetermined signal value, so as to obtain a detection signal. The unit 16 further comprises means for, in response to said detection signal, deriving an error signal from at least one sample value of the signal received at the input 24 at either side of the instant at which said signal crosses said predetermined signal value. The predetermined signal value may be fixed, for example the zero value or the DC signal value. However, if the signal has a varying mean signal value, the predetermined signal values may have a relationship with said varying mean signal value. FIG. 2 shows an error signal obtained by calculating the slope around zero crossings by subtracting a sample value directly after a zero crossings and a sample value directly preceding said zero crossing. Since the error signal is obtained from a nominal equalized signal, the error signal has an almost constant value.

It has been found that the head-to-tape distance loss has a relationship with the slope of the signal around zero crossings. FIG. 3 shows the slope of the signal around zero crossings versus the amplitude at $F_{Nyquist}$. The head-to-tape distance loss may be expressed as the loss of amplitude at $F_{Nyquist}$. There the slope signal, see the error signal in FIG. 2, also has almost to constant value for a nominal equalized signal, the slope signal can be used as a control signal. A first control signal having a relationship with the head-to-tape distance, preferably the first sample values at either side of the instant at which the signal crosses the predetermined value, may be obtained by the following arithmetic combination:

$$S(t)=c\times|X(t)-X(t-1)|,$$

where $S(t)$ is the first control signal, $X(t)$ is a sample of the signal directly following said instant, $X(t-1)$ is a sample of said signal directly preceding said instant and c is a constant. A first control signal having a relationship with the difference in delay, preferably the first sample values at either side of the instant at which the signal crosses the predetermined value, may be obtained by the following arithmetic combination:

$$S(t)=c\times(X(t)-X(t-1)),$$

where $S(t)$ is the first control signal, $X(t)$ is a sample of the signal directly following said instant, $X(t-1)$ is a sample of said signal directly preceding said instant and c is a constant. The first control signals thus obtained are used in a control loop to correct for the head-tape distance variations and/or the differences in delay.

Before the first control signal is applied to the equalizer control signal generator unit 20, the first control signal may be processed by the unit 18 so as to obtain a stabler control signal in order to obtain a less noisy control loop. The unit 18 may be adapted to generate an averaged first control signal by averaging the values of, for example, the N last generated first control signal values. However, any other suitable methods to generate a stabler first control signal might be used.

The equalizer control signal unit 20 generates the equalizer control signal from the first control signal, or it averaged representation. The equalizer control signal may comprise the values for filter coefficients of the FIR filter in the variable equalizer. However, depending on the complexity of the variable equalizer, the variable equalizer may be adapted to generate the coefficients of the FIR filter internally from the equalizer control signal. In this case the equalizer control signal has a relationship with the coefficients to be used in the variable equalizer. As said before, the head-to-tape distance variations can approximately be compensated with a simple 3-tap FIR filter having a transfer function $$H(z)=C_0+2C_1z^{-1}+C_0z^{-2},$$

where $C_0=\frac{1}{2}-C_1$. The center tap $2C_1$ is calculated from the first control signal in such a manner that the boost of the filter matches the measured loss. The two outer taps having the same value are calculated in such a manner that the DC-gain of the filter remains constant, for example the DC-gain is 32. The coefficient $C_1$ is preferably calculated with the following formula:

$$c1' = c1 + \alpha \cdot (c1-8) \cdot \left(\frac{reference}{S(t)} - 1\right)$$

Herein, $S(t)$ is the value of a sample of the first control signal, the parameter reference is a reference value having a relationship with the required nominal slope around the zero crossings, $c1$ is the current value of the parameter $C_1$ in the transfer function, and $c1'$ is the next value of the parameter $C_1$ in the transfer function. The parameter reference controls the nominal boost of the FIR filter and the measured slope around the zero crossing in the equalized control signal. The bandwidth of the loop is controlled with the gain variable $\alpha$. Furthermore, $\alpha$ controls the amount of averaging by the loop. The coefficient $C_0$ can be obtained with the formula: $C_0=16-C_1$.

The calculation of the coefficient c1 is preferably done with a look-up table (LUT) because of the non-linear form of the formula. The first control signal, the parameter reference and the current value of $C_1$ are then input signals for the look up table. The output signal of the look-up table is the new value of the center tap coefficient $C_1$.

Preferably, two restrictions are made in the implementation of the control loop, namely a minimum boost (0 dB) and a maximum boost (10 dB) of the FIR filter. This is because outside these regions there is unlikely to be anymore gain in the performance of the FIR. With $C_0=0$ and $C_1=16$ the FIR filter has a boost of 0 dB. With $C_0-16$ and $C_1=32$ the FIR filter has a boost of 10 dB at the sample frequency of the FIR filter.

FIG. 4 shows an embodiment of an update loop for the coefficients. It is a proportional loop where some averaging is achieved by choosing a proper value of $\alpha$. An input terminal 40 receives the equalized signal. A unit 42, performing the function of the unit 16 in FIG. 1, processes the equalized signal so as to obtain the first control signal. A unit 44 subtracts a reference signal from the first control signal so as to obtain an error signal. A unit 46 processes the error signal and the current coefficient $C_1$ so as to obtain a normalized adjustment signal. A unit 48 is adapted to multiply said normalized adjustment signal by the parameter $\alpha$ so as to obtain an adjustment signal. The signal combination unit 50 is adapted to add the adjustment signal to the signal representing the current coefficient $C_1$, so as to obtain the next value of the coefficient $C_1$. The resulting next value of $C_1$ is equal to $c1'$ in the afore-mentioned formula. The unit 52 is adapted to limit the next value of the coefficient $C_1$ to the coefficient value range for the minimum and maximum boost so as to obtain the next value of coefficient $C_1$. The next value of coefficient $C_1$ is supplied to the variable equalizer via a delay unit 56. The units 44, 46, 48 and 50 implement the afore-mentioned formula and may be realized in a look-up table 54, in order to obtain the next value of the coefficient $C_1$. It should be noted that the function of unit 52 can be integrated in the look-up table 54.

FIG. 5 shows a second embodiment of the arrangement in accordance with the invention. This embodiment is a version which slightly differs from the arrangement of FIG. 1 in that the variable equalizer 6' in the form of an analog filter is adapted to filter the received signal so as to obtain an analog equalized signal. Furthermore, the analog equalized signal is supplied to a bit detection unit 12' adapted to detect a sequence of bits in the analog equalized signal. The analog equalized signal is further supplied to an analog to digital converter 4'. Said AD converter 4' is adapted to obtain the first signal having asynchronous samples. The first signal is successively processed by the unit 16, the unit 18 and the unit 20' so as to obtain a variable equalizer control signal for controlling the transfer function of the analog variable equalizer.

FIG. 6 shows a third embodiment of the arrangement in accordance with the invention. The units having the same reference signs as the units in FIG. 1 have been described in the description with reference to FIG. 1. In the present embodiment the variable equalizer is controlled with a feed-forward control loop. An equalizer control signal generator unit 20" in this embodiment is adapted to generate the equalizer control signal in response to the first control signal or the averaged first control signal supplied by the unit 16 or unit 18, respectively. The third embodiment enables the variable equalizer to be controlled faster than by means of the embodiments having a feedback loop for controlling the variable equalizer.

Though the invention is described with reference to preferred embodiments thereof, it is to be understood that these are non-limitative examples. Thus, various modifications are conceivable to those skilled in the art, without departing from the scope of the invention, as defined by the claims. As an example, the input of the bit detector 12' in the second embodiment may be coupled to the output of the AD converter 4'. In this case the bit detector 12' may be the same bit detector as in the first embodiment in FIG. 1.

The word 'comprising' does not exclude the presence of other elements or steps than those listed in a claim. Any reference signs do not limit the scope of the claims. The invention may be implemented by means of hardware as well as software. Several "means" may be represented by the same item of hardware. Furthermore the invention resides in each and every novel feature or combination of features.

What is claimed is:

1. An arrangement for receiving a digital signal from a transmission medium, the arrangement comprising:

input means for receiving a signal from the transmission medium, asynchronous sampling means for sampling an analog signal so as to obtain a first signal having asynchronous samples, variable equalizer means having an input coupled to the input means, a control signal input for receiving a control signal, and an output for supplying an equalized signal, equalizer control signal generator means having an input, and an output for supplying an equalizer control signal, which output is coupled to the control signal input of the equalizer means, signal detector means, having an input coupled to the output of the variable equalizer means, and an output for supplying the digital signal, the signal detector means being adapted to detect the digital signal from the equalized signal, an output terminal coupled to the output of the signal detector means, for supplying the digital signal, characterized in that:

the input of the equalizer control signal generator means is adapted to receive a second signal having asynchronous samples, the equalizer control signal generator means comprises detection means for detecting the instant at which the second signal crosses a predetermined signal value, so as to obtain a detection signal, and means for, in response to said detection signal, deriving the equalizer control signal from at least one asynchronous sample value of the second signal at either side or the instant at which the second signal crosses said predetermined signal value, said equalizer control signal being derived from said at least two samples by means of an operation equivalent to arithmetically combining said at least two asynchronous sample values.

2. An arrangement as claimed in claim 1, characterized in that an input of the asynchronous sampling means is coupled to the input means, and an output of the asynchronous sampling means is coupled to the input of the variable equalizer means, and the input of the equalizer control signal generator means is coupled to the output of the variable equalizer means, for receiving said second signal having asynchronous samples.

3. An arrangement as claimed in claim 1, characterized in that an input of the asynchronous sampling means is coupled to the input means, and an output of the asynchronous sampling means is coupled to the input of the variable equalizer means and the input of the equalizer control signal generator means, for receiving said second signal having asynchronous samples.

4. An arrangement as claimed in claim 2, characterized in that, the variable equalizer means comprises a FIR filter.

5. An arrangement as claimed in claim 4, characterized in that the FIR filter is a 3-tap FIR filter preferably having a transfer function $H(z)=C_0+2C_1z^{-1}+C_0z^{-2}$, $C_0$ and $C_1$ being variables which comply with $C_0=\frac{1}{2}-C_1$ and which variables have a relationship with the equalizer control signal.

6. An arrangement as claimed in claim 4, characterized in that the FIR filter is a 3-tap FIR filter preferably having a transfer function $H(z)=\Delta+z^{-1}-\Delta z^{-2}$, $\Delta$ being a variable having a relationship with the equalizer control signal.

7. An arrangement as claimed in claim 4, characterized in that the FIR filter is a 3-tap FIR filter preferably having a transfer function:

$H(z)=(C_0+\Delta)+2C_1z^{-1}+(C_0-\Delta)\ z^{-2}$, where $C_0$, $C_1$ and $\Delta$ are variables having a relationship with the equalizer control signal which comprises with $C_0=\frac{1}{2}-C_1$.

8. An arrangement as claimed in claim 1, characterized in that an input of the asynchronous sampling means is coupled to the output of the variable equalizer means, and the input of the equalizer control signal generator means is coupled to an output of the asynchronous sampling means, for receiving said second signal having asynchronous samples.

9. An arrangement as claimed in claim 1, characterized in that said arithmetic combination means complies with the formula:

$S(t)=c\times|X(t)-X(t-1)|$, where $X(t)$ is a sample of the second signal directly following said instant, $X(t-1)$ is a sample of the second signal directly preceding said instant, c is a constant, and $S(t)$ is an intermediate signal for deriving said equalizer control signal.

10. An arrangement as claimed in any of claim 1, characterized in that said arithmetic combination means comply with the formula:

$S(t)=c\times(X(t)-X(t-1))$, where $X(t)$ is a sample of the second signal directly following said instant, $X(t-1)$ is a sample of the second signal directly preceding said instant, c is a constant, and $S(t)$ is an intermediate signal for deriving said equalizer control signal.

11. An arrangement as claimed in claim 9, characterized in that the equalizer control signal generator means comprise means for averaging the intermediate signal so as to obtain an averaged signal, the equalizer control signal being generated in response to said average signal.

12. An arrangement as claimed in claim 1, characterized in that the equalizer control signal generator means comprises a look-up table in order to obtain the equalizer control signal in response to the first signal.

13. An arrangement as claimed in claim 1, wherein the predetermined signal value is a fixed value.

14. An arrangement as claimed in claim 1, wherein the predetermined signal value is a means value of the signal.

15. An arrangement for receiving a signal from a transmission medium, the arrangement comprising:

an input device arranged to receive the signal from the transmission medium, an asynchronous sampling device for sampling the signal to obtain a first signal having asynchronous samples, a variable equalizer having an input to receive the first signal, a control signal input for receiving a control signal, and an output for supplying an equalized signal, an equalizer control signal generator coupled to receive an averaged version of the equalized signal at an input, and an output for supplying an equalizer control signal coupled to the control signal input of the variable equalizer, a signal detector coupled to the equalized signal, the signal detector adapted to detect a digital signal from the equalized signal and provide an output for the digital signal, an output terminal coupled to the output of the signal detector means, for supplying the digital signal, wherein, the input of the equalizer control signal generator is adapted to receive a second signal having asynchronous samples, the equalizer control signal generator comprises a detection device that detects periods when the second signal crosses a predetermined signal value to obtain a detection signal, and a derivation device that derives the equalizer control signal in response to the detection signal, the derivation device deriving the equalizer control signal from at least one asynchronous sample value of the second signal at either side of the instant at which the second signal crosses said predetermined signal value, the equalizer control signal being derived from said at least two samples by means of an operation equivalent to arithmetically combining said at least two asynchronous sample values.

16. An arrangement as claimed in claim 1, wherein the predetermined signal value is a fixed value.

17. An arrangement as claimed in claim 1, wherein the predetermined signal value is a means value of the signal.

18. An arrangement as claimed in claim 15, characterized in that said arithmetic combination means coupled with the formula:

$S(t)=c \times |X(t)-X(t-1)|$, where $X(t)$ is a sample of the second signal directly following said instant $X(t-1)$ is a sample of the second signal directly preceding said instant, c is a constant, and $S(t)$ is an intermediate signal for deriving said equalizer control signal.

19. An arrangement as claimed in claim 15, characterized in that said arithmetic combination means comply with the formula:

$S(t)=c \times (X(t)-X(t-1))$, where $X(t)$ is a sample of the second signal directly following said instant, $X(t-1)$ is a sample of the second signal directly preceding said instant, c is a constant, and $S(t)$ is an intermediate signal for deriving said equalizer control signal.

20. An arrangement as claimed in claim 19, characterized in that the equalizer control signal generator means comprise means for averaging the intermediate signal so as to obtain an averaged signal, the equalizer control signal being generated in response to said average signal.

* * * * *